US007220981B2

(12) United States Patent
Imai

(10) Patent No.: US 7,220,981 B2
(45) Date of Patent: May 22, 2007

(54) RADIOGRAPHIC-IMAGE RECORDING MEDIUM CONTAINING SHOCK-RESISTANT MEMBER

(75) Inventor: Shinji Imai, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 301 days.

(21) Appl. No.: 10/706,039

(22) Filed: Nov. 13, 2003

(65) Prior Publication Data

US 2004/0104365 A1 Jun. 3, 2004

(30) Foreign Application Priority Data

Nov. 20, 2002 (JP) ............................ 2002-336519

(51) Int. Cl.
*G01T 1/20* (2006.01)

(52) U.S. Cl. ...................................................... 250/591

(58) Field of Classification Search ................ 250/591, 250/580, 484.4; 205/370.11
See application file for complete search history.

(56) References Cited

U.S. PATENT DOCUMENTS

| | | | | |
|---|---|---|---|---|
| 4,855,598 | A | 8/1989 | Ohgoda et al. | |
| 5,198,685 | A * | 3/1993 | Kitani et al. | 257/82 |
| 6,075,250 | A * | 6/2000 | Fukui et al. | 250/484.4 |
| 6,121,620 | A | 9/2000 | Tashiro et al. | |
| 6,268,614 | B1 | 7/2001 | Imai | |
| 6,614,045 | B2 * | 9/2003 | Shoji | 250/591 |
| 2002/0092992 | A1 * | 7/2002 | Izumi | 250/370.12 |
| 2002/0121606 | A1 * | 9/2002 | Okada et al. | 250/370.11 |
| 2002/0148949 | A1 * | 10/2002 | Sato et al. | 250/214.1 |

* cited by examiner

*Primary Examiner*—David Porta
*Assistant Examiner*—David S. Baker
(74) *Attorney, Agent, or Firm*—Sughrue Mion, PLLC

(57) ABSTRACT

An image recording medium includes: a support which is transparent to radiation for use in recording, and resistant to shock; a wavelength conversion layer which contains an organic binder and a fluorescent material which converts the radiation into visible light; a first electrode layer which is transparent to the visible light; a recording-side photoconductive layer which exhibits photoconductivity when the recording-side photoconductive layer is exposed to the visible light; a charge storage region which stores electric charges which are generated in the recording-side photoconductive layer in response to exposure to the visible light; a reading-side photoconductive layer which exhibits photoconductivity when the reading-side photoconductive layer is exposed to reading light; and a second electrode layer which is transparent to the reading light.

5 Claims, 5 Drawing Sheets

10a-2

RADIOGRAPHIC-IMAGE RECORDING MEDIUM CONTAINING SHOCK-RESISTANT MEMBER

BACKGROUND OF THE INVENTION

1. Field of the Invention

The present invention relates to a radiographic-image recording medium which records radiographic-image information by storing electric charges generated in response to exposure to radiation.

2. Description of the Related Art

The following documents (1) and (2) disclose information related to the present invention.

(1) U.S. Pat. No. 6,268,614 issued to the present inventor (Shinji Imai) and corresponding to Japanese Patent Applications Nos. 10-215378 and 10-232824 (which are laid open as Japanese Unexamined Patent Publication No. 2000-105297)

(2) U.S. Pat. No. 6,121,620 corresponding to Japanese Patent Application No. 8-34903 (which is laid open as Japanese Unexamined Patent Publication No. 9-230054)

Conventionally, radiographic-image recording mediums, which record radiographic images by storing in a charge storage region electric charges the amounts of which respectively correspond to doses of radiation such as X-rays, are used in many applications such as medical radiography. Various types of radiographic-image recording mediums basically operating as above have been proposed.

In aforementioned document (1), the present inventor has proposed a radiographic-image recording medium which can concurrently realize high speed response in reading and efficient readout of signal charges. In the proposed radiographic-image recording medium, a first electrode layer, a recording-side photoconductive layer, a charge transportation layer, a reading-side photoconductive layer, and a second electrode layer, stacked in this order. The first electrode layer is transparent to radiation for use in recording or light emitted due to excitation by the radiation for recording, the recording-side photoconductive layer becomes conductive when the recording-side photoconductive layer is exposed to the above radiation or light, the charge transport layer behaves substantially as an insulator against latent-image charges and substantially as a conductor of charges having the opposite polarity to the latent-image polarity, the reading-side photoconductive layer exhibits conductivity when the reading photoconductive layer is exposed to an electromagnetic wave for reading, and the second photoconductive layer is transparent to the electromagnetic wave for reading. Thus, when the radiographic-image recording medium is irradiated through the first electrode layer with the radiation for recording, a radiographic image is recorded by storing in a charge storage region electric charges the amounts of which correspond to the doses of the radiation. The charge storage region is formed substantially at an interface between the recording-side photoconductive layer and the charge transport layer.

Further, in document (1), the present inventor has also proposed a radiographic-image recording medium in which a wavelength conversion layer containing a fluorescent material (CsI) is arranged, where the fluorescent material emits visible light in the blue wavelength range in response to exposure to radiation for recording.

In each of the above radiographic-image recording mediums disclosed in document (1), information on the radiographic image recorded in the radiographic-image recording medium can be read out by scanning the radiographic-image recording medium with a laser light beam or a light beam having a linearly-shaped cross section.

Meanwhile, aforementioned document (2) discloses a radiographic-image recording medium includes a fluorescent sheet and a glass substrate on which a plurality of photoelectric conversion elements are arranged, and the glass substrate and the fluorescent sheet are bonded together. Each photoelectric conversion element on the glass substrate is constituted by a photodiode and a TFT (thin-film transistor) switch, and the fluorescent sheet emits fluorescent light in response to exposure to radiation. In this radiographic-image recording medium, each photodiode photoelectrically converts the fluorescent light emitted from the fluorescent sheet into an electric charge. Then, the electric charge is stored and read out by controlling the TFT switches on and off.

The above radiographic-image recording mediums are mainly used in hospitals and the like. It is desirable that each radiographic-image recording medium is contained in a cassette or the like so as to be portable, and is shock resistant so that the radiographic-image recording medium is not damaged even when the radiographic-image recording medium is unintentionally dropped. Further, since the radiographic-image recording mediums may be used outside the hospitals, for example, in a mobile van service, there are intense demands for portability and shock resistance of the radiographic-image recording mediums.

However, the radiographic-image recording mediums disclosed in documents (1) and (2) have the following drawbacks (i) and (ii).

(i) The recording-side photoconductive layer in each radiographic-image recording medium disclosed in document (1) is made of a-Se. The thickness of the a-Se film required for satisfactorily detecting applied radiation is as much as about 1,000 micrometers. a-Se films having such a thickness are susceptible to damage when dropped. When the aforementioned wavelength conversion layer is used, the thickness of the recording-side photoconductive layer can be reduced, and the recording-side photoconductive layer can be made less susceptible to damage. However, since the above wavelength conversion layer is produced by vapor deposition of CsI, which forms a needle crystal, the wavelength conversion layer per se is very susceptible to damage.

(ii) In the radiographic-image recording medium disclosed in document (2), in order to form the TFTs on the substrate, the substrate is required to be made of heat resistant non-alkali glass or quartz glass, and the thickness of the substrate is required to be 0.7 to 3 mm. However, such a glass substrate also breaks easily upon impact, such as that applied when dropped.

SUMMARY OF THE INVENTION

The present invention has been developed in view of the above circumstances.

It is an object of the present invention to provide a radiographic-image recording medium which records a radiographic image by storing electric charges generated in response to exposure to radiation, and exhibits shock resistance so that the radiographic-image recording medium is not damaged even when shock is applied thereto, such as that applied when dropped.

(I) In order to accomplish the above object, the first aspect of the present invention is provided. According to the first aspect of the present invention, there is provided a radiographic-image recording medium which comprises: a support which is transparent to radiation for use in recording, and resistant to shock; a wavelength conversion layer which is formed under the support, and contains an organic binder and a fluorescent material which converts the radiation into a first electromagnetic wave for use in recording, where the first electromagnetic wave belongs to a first wavelength band different from a second wavelength band to which the radiation belongs; a first electrode layer which is formed under the wavelength conversion layer, and transparent to the first electromagnetic wave; a recording-side photoconductive layer which is formed under the first electrode layer, and exhibits photoconductivity when the recording-side photoconductive layer is exposed to the first electromagnetic wave after the first electromagnetic wave has passed through the first electrode layer; a charge storage region which is formed under the recording-side photoconductive layer, and stores electric charges which are generated in the recording-side photoconductive layer in response to exposure to the first electromagnetic wave; a reading-side photoconductive layer which is formed under the charge storage region, and exhibits photoconductivity when the reading-side photoconductive layer is exposed to a second electromagnetic wave for reading; and a second electrode layer which is formed under the reading-side photoconductive layer, and transparent to the second electromagnetic wave.

Since the radiographic-image recording medium according to the first aspect of the present invention uses the shock-resistant support which is transparent to the radiation (for use in recording) and the wavelength conversion layer containing an organic binder and a fluorescent material which converts the radiation into the first electromagnetic wave (for use in recording), the radiographic-image recording medium according to the first aspect of the present invention resists breakage even when the radiographic-image recording medium is subjected to shock, e.g., dropped, and the portability of the radiographic-image recording medium is enhanced. In addition, since the thickness of the recording-side photoconductive layer can be increased, it is also possible to make the recording-side photoconductive layer resistant to breaking.

Further, in the case where the support is made of a carbon plate, the support can be used as a casing member which is transparent to an X-ray, since the carbon plate shades the other layers of the radiographic-image recording medium from light. In addition, since the support realized by a carbon plate is conductive, the support has a function of electromagnetic shielding.

Preferably, the radiographic-image recording medium according to the first aspect of the present invention may also have one or any possible combination of the following additional features (i) to (iv).

(i) The radiographic-image recording medium according to the first aspect of the present invention may further comprise a substrate which is resistant to shock, and on which the second electrode layer, the reading-side photoconductive layer, the charge storage region, the recording-side photoconductive layer, the first electrode layer, the wavelength conversion layer, and the support are formed. In this case, the shock resistance of the radiographic-image recording medium is further enhanced, since the shock-resistant substrate is used instead of the glass substrate which is conventionally used.

The expression "resistant to shock" means to have shock resistance higher than the shock resistance of glass. The shock resistance of the substrate is so high that the substrate does not break even when the radiographic-image recording medium is inadvertently dropped. Specifically, the shock resistance of the substrate is such that the substrate does not break when the radiographic-image recording medium is dropped from a height of 1 m. For example, the substrate is made of a resin such as polyimide or polyethylene, realized by a carbon plate, or constituted by a base made of a resin such as polycarbonate or polyimide and a thin glass film bonded to the base.

In the case where the above substrate is a synthesized member formed by combining a thin glass film with a resin base, and the second electrode layer is formed on the thin glass film, it is possible to improve the flatness of the surface of the second electrode layer, and reduce defects in recorded images.

(ii) The radiographic-image recording medium according to the first aspect of the present invention may further comprise a substrate which is realized by a thin glass film, and on which the second electrode layer, the reading-side photoconductive layer, the charge storage region, the recording-side photoconductive layer, the first electrode layer, the wavelength conversion layer, and the support are formed.

For example, the thickness of the thin glass film is about 0.05 to 0.2 mm.

Although the shock resistance of the thin glass film is low when the thin glass film is used alone, the shock resistance of the thin glass film is increased when the thin glass film is formed in the radiographic-image recording medium. Therefore, it is possible to enhance the resistance of the radiographic-image recording medium to mechanical shock (which is caused by, for example, the radiographic-image recording medium being dropped), in comparison with the conventional radiographic-image recording mediums in each of which layers are formed on a glass substrate having a thickness of about 0.7 to 3 mm.

Since the surface of the substrate realized by a thin glass film is less prone to damage and has a high degree of flatness, it is possible to prevent scattering of the second electromagnetic wave (reading light), and obtain high-quality radiographic images.

It is possible to produce the radiographic-image recording medium having the feature (ii) by using a synthesized member in which the above thin glass film is combined with a resin member, forming the layers from the second electrode layer to the support on the base, and removing the resin member after the formation of the layers.

In addition, the above thin glass film and the resin member may be bonded together through a viscoelastic material (e.g., a gel sheet of silicone or the like). In this case, it is possible to easily remove the above resin member after the formation of the layers of the radiographic-image recording medium.

(iii) The substrate and the support may be made of materials having approximately identical thermal expansion coefficients. In this case, it is possible to prevent cracking and warpage which can occur depending on the difference in the thermal expansion coefficient, as well as to enhance the resistance to shock which is caused by being dropped or the like.

(iv) The wavelength conversion layer and the first electrode layer may be bonded together through a viscoelastic material which is transparent to the first electromagnetic wave (i.e., the electromagnetic wave for recording). In this case, flexibility at the interface between the wavelength conversion layer and the first electrode layer increases. In addition, since the wavelength conversion layer and the first electrode layer can be bonded together at normal temperature, hardening of an adhesive is unnecessary. Therefore, it is possible to prevent warpage and the like caused by the adhesive hardening.

In addition, since the viscoelastic material can be easily deformed, even when there is a substantial difference in the thermal expansion coefficient between the support and the substrate, differences in the displacement between the support and the substrate can be absorbed. Therefore, it is possible to prevent cracking which can occur during storage at low temperature.

For example, the viscoelastic material can be realized by a gel sheet of silicone or the like which can bond the wavelength conversion layer and the first electrode layer together.

(II) In order to accomplish the aforementioned object, the second aspect of the present invention is provided. According to the second aspect of the present invention, there is provided a recording-medium unit comprising: the radiographic-image recording medium according to the first aspect of the present invention; a reading-light illumination unit which illuminates the radiographic-image recording medium with the second electromagnetic wave for reading; and a portable casing which encloses the radiographic-image recording medium and the reading-light illumination unit, is transparent to the radiation for use in recording, and shields the radiographic-image recording medium from the first and second electromagnetic waves.

The expression "shields the radiographic-image recording medium from the first and second electromagnetic waves" means to shield the radiographic-image recording medium from not only the first electromagnetic wave emitted from the fluorescent material and the second electromagnetic wave emitted from the reading-light illumination unit but all other electromagnetic waves in at least one range of wavelengths with which the state of electric charges in the radiographic-image recording medium can be affected.

According to the second aspect of the present invention, it is possible to realize a portable radiographic-image recording medium to which a reading-light illumination unit is attached.

(III) In order to accomplish the aforementioned object, the third aspect of the present invention is provided. According to the third aspect of the present invention, there is provided a radiographic-image recording medium which comprises: a support which is transparent to radiation for use in recording, and resistant to shock; a wavelength conversion layer which is formed under the support, and contains an organic binder and a fluorescent material which converts the radiation into an electromagnetic wave for use in recording, where the electromagnetic wave belongs to a first wavelength band different from a second wavelength band to which the radiation belongs; and a photoelectric conversion layer which is formed under the wavelength conversion layer, and contains a substrate and at least one photoelectric element which photoelectrically converts the electromagnetic wave into at least one electric signal, where the substrate includes a plate of a shock-resistant material and a thin glass film formed on the plate, and the at least one photoelectric element is arranged on the thin glass film.

For example, each of the above at least one photoelectric element is constituted by a photodiode and a TFT (thin-film transistor) switch.

Although glass substrates are used in the conventional radiographic-image recording mediums in which recording light is photoelectrically converted by photoelectric conversion elements using TFTs and the like, the conventional glass substrates are not used in the radiographic-image recording medium according to the third aspect of the present invention. Therefore, the substrate in the radiographic-image recording medium according to the third aspect of the present invention is more resistant to mechanical shock caused by, for example, the radiographic-image recording medium being dropped, in comparison with the conventional glass substrates. Thus, the radiographic-image recording medium according to the third aspect of the present invention becomes highly portable.

Preferably, in the radiographic-image recording medium according to the third aspect of the present invention, the plate and the support may be made of materials having approximately identical thermal expansion coefficients. In this case, it is possible to prevent cracking and warpage which can occur depending on the difference in the thermal expansion coefficient, as well as to enhance the resistance to shock which is caused by being dropped or the like.

(IV) In order to accomplish the aforementioned object, the fourth aspect of the present invention is provided. According to the fourth aspect of the present invention, there is provided a radiographic-image recording medium which comprises: a support which is transparent to radiation for use in recording, and resistant to shock; a wavelength conversion layer which is formed under the support, and contains an organic binder and a fluorescent material which converts the radiation into an electromagnetic wave for use in recording, where the electromagnetic wave belongs to a first wavelength band different from a second wavelength band to which the radiation belongs; and a photoelectric conversion layer which is formed under the wavelength conversion layer, and contains a substrate and at least one photoelectric element which photoelectrically converts the electromagnetic wave into at least one electric signal, where the substrate is realized by a thin glass film, and the at least one photoelectric element is arranged on the substrate.

Although glass substrates having a thickness of 0.7 to 3 mm are used in the conventional radiographic-image recording mediums in which recording light is photoelectrically converted by photoelectric conversion elements using TFTs and the like, the substrate realized by the thin glass film instead of the conventional glass substrates is used in the radiographic-image recording medium according to the fourth aspect of the present invention. Therefore, the substrate in the radiographic-image recording medium according to the fourth aspect of the present invention is more resistant to mechanical shock caused by, for example, the radiographic-image recording medium being dropped, in comparison with the conventional glass substrates having a thickness of 0.7 to 3 mm. Thus, the radiographic-image recording medium according to the fourth aspect of the present invention becomes highly portable. In addition, since the plate of the shock-resistant material, which is arranged in the third aspect of the present invention, is not arranged in the radiographic-image recording medium according to the fourth aspect of the present invention, it is possible to reduce the weight of the radiographic-image recording medium.

The radiographic-image recording medium according to the fourth aspect of the present invention can be produced by producing the radiographic-image recording medium according to the third aspect of the present invention, and then removing the plate of the shock-resistant material.

Preferably, in the radiographic-image recording mediums according to the third and fourth aspects of the present invention, the wavelength conversion layer and the photoelectric conversion layer are bonded together through a viscoelastic material which is transparent to the electromagnetic wave for recording. In this case, flexibility at the interface between the wavelength conversion layer and the photoelectric conversion layer increases. In addition, since the wavelength conversion layer and the photoelectric conversion layer together can be bonded together at normal temperature, hardening of an adhesive is unnecessary. Therefore, it is possible to prevent warpage and the like which are caused by the adhesive hardening.

DESCRIPTION OF PREFERRED EMBODIMENTS

Embodiments of the present invention are explained in detail below with reference to the attached drawings.

First Embodiment

Figure 1A:
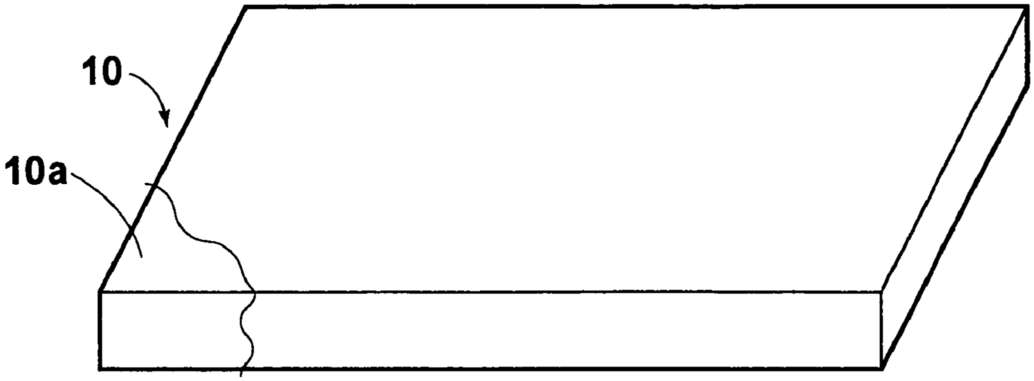
FIG. 1A is a perspective view of a radiographic-image recording medium according to a first embodiment of the present invention.
Figure 1B:
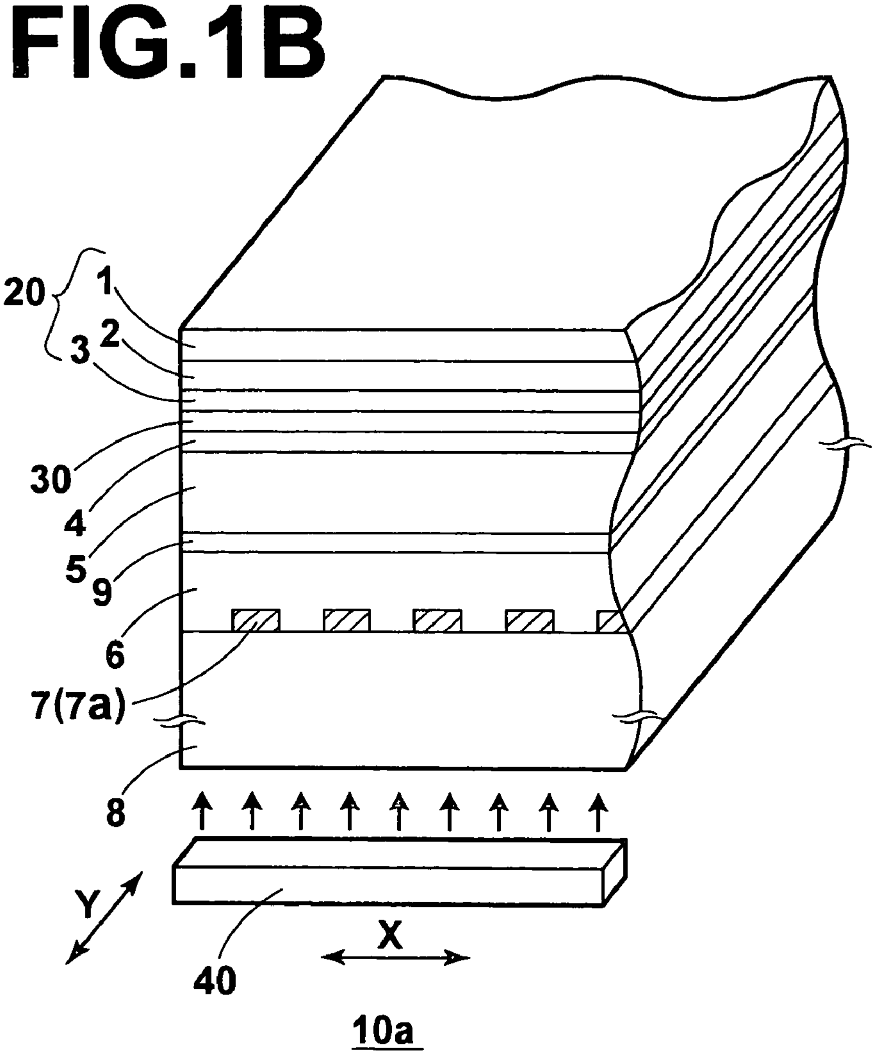
FIG. 1B is a magnified perspective view of a cutaway portion of the radiographic-image recording medium of FIG. 1A, where a cross section of the cutaway portion is illustrated.

FIG. 1A is a perspective view of a radiographic-image recording medium according to the first embodiment of the present invention, and FIG. 1B is a magnified perspective view of a cutaway portion 10*a* of the radiographic-image recording medium 10 of FIG. 1A, where a cross section of the cutaway portion 10*a* is illustrated in FIG. 1B.

The radiographic-image recording medium 10 illustrated in FIGS. 1A and 1B comprises a fluorescent layer 20, a first electrode layer 4, a recording-side photoconductive layer 5, a reading-side photoconductive layer 6, a second electrode layer 7, and a substrate 8 are arranged in this order. In addition, a charge storage region 9 is formed at the interface between the recording-side photoconductive layer 5 and the reading-side photoconductive layer 6.

The fluorescent layer 20 contains a fluorescent material which converts radiation for use in recording, into visible light. The first electrode layer 4 is transparent to the visible light which is emitted from the fluorescent layer 20. The recording-side photoconductive layer 5 exhibits conductivity in response to exposure to the visible light which has passed through the first electrode layer 4. The charge storage region 9 stores electric charges which are generated in the recording-side photoconductive layer 5. The reading-side photoconductive layer 6 exhibits conductivity in response to exposure to reading light. The second electrode layer 7 and the substrate 8 are transparent to the reading light.

The fluorescent layer 20 is constituted by a support 1, a wavelength conversion layer 2, and a protection layer 3, which are formed in this order. The support 1 is transparent to the radiation for use in recording, and resistant to shock. The wavelength conversion layer 2 contains an organic binder and a fluorescent material which converts the radiation into the visible light. The protection layer 3 is transparent to the visible light emitted from the wavelength conversion layer 2, and protects a surface of the wavelength conversion layer 2. The protection layer 3 and the first electrode layer 4 are optically contacted with each other through an adhesive layer 30.

The support 1 in the fluorescent layer 20 can be realized by a sheet of a resin such as polyimide or polyethylene. Preferably, the thickness of the resin sheet is about 0.1 to 3 mm. Alternatively, the support 1 may be realized by a carbon plate having a thickness of about 0.1 to 3 mm. The fluorescent material in the wavelength conversion layer 2 is a material which converts the radiation into visible light in the blue wavelength range, and is, for example, $CaWO_4$, LaOBr:Tm, BaFCl:Eu, or $YTaO_4$:Nb. In addition, the organic binder may be a resin binder such as polyvinyl alcohol. The wavelength conversion layer 2 can be produced by mixing the fluorescent material into an aqueous solution of polyvinyl alcohol so as to produce a slurry, applying the slurry to the support 1, and drying the slurry. Preferably, the thickness of the wavelength conversion layer 2 is about 200 micrometers.

The first electrode layer 4 is required to be made of a material which is transparent to the visible light generated in the wavelength conversion layer 2, and the second electrode layer 7 is required to be made of a material which is transparent to the reading light. For example, each of the first electrode layer 4 and the second electrode layer 7 can be made of an $SnO_2$ film (NESA film), an ITO (indium tin oxide) film, a film of IDIXO (Idemitsu Indium X-metal Oxide), or the like, where IDIXO is a transparent amorphous oxide, and manufactured by Idemitsu Kosan Co., Ltd. In this case, the thicknesses of the first electrode layer 4 and the second electrode layer 7 are, for example, 50 to 200 nm.

The second electrode layer 7 is realized by a striped electrode array comprised of a plurality of elements (linear electrodes) 7*a* which are formed with a pitch corresponding to a pixel pitch. In the radiographic-image recording medium 10 illustrated in FIGS. 1A and 1B, no insulator is arranged between the plurality of elements 7*a*, and the gaps between the plurality of elements 7*a* are filled with the reading-side photoconductive layer 6. That is, the second electrode layer 7 is realized by only the plurality of elements 7*a*. Alternatively, it is possible to fill the gaps between the plurality of elements 7*a* with an insulator.

In addition, the first electrode layer 4 can also be realized by a striped electrode array formed in a similar manner to the second electrode layer 7.

The recording-side photoconductive layer 5 can be made of any material which exhibits conductivity when the recording-side photoconductive layer 5 is illuminated with the visible (blue) light emitted from the fluorescent layer 20. A material of which the recording-side photoconductive layer 5 is appropriately made is a-Se since a-Se can convert light in the wavelength range of 360 to 460 nm into electric charges with high quantum efficiency. The use of a-Se is advantageous in that a-Se exhibits a thermal expansion coefficient close to the thermal expansion coefficient of the support 1.

The reading-side photoconductive layer 6 may be made of any material which exhibits conductivity when the reading-side photoconductive layer 6 is illuminated with the reading light. For example, it is preferable that the reading-side photoconductive layer 6 is made of a photoconductive material containing as a main component at least one of a-Se, Se—Te, Se—As—Te, nonmetallic phthalocyanine, metallic phthalocyanine, MgPc (magnesium phthalocyanine), VoPc (phase II of vanadyl phthalocyanine), CuPc (copper phthalocyanine), and the like.

The reading light is applied to the entire area of the radiographic-image recording medium 10 by moving a linear light source 40 along the Y-axis direction as illustrated in FIG. 1B, where the linear light source 40 is constituted by a number of LEDs (light-emitting diodes) which are linearly arranged along the X-axis direction.

In the case where the reading-side photoconductive layer 6 is made of a-Se, it is preferable that the wavelength of the reading light is about 460 nm. On the other hand, in the case where the reading-side photoconductive layer 6 is made of phthalocyanine or polycarbonate, it is preferable that the wavelength of the reading light is about 525 nm.

It is preferable that each of the recording-side photoconductive layer 5 and the reading-side photoconductive layer 6 has a thickness of about 10 micrometers.

Preferably, the substrate 8 is realized by a resin sheet, and has a thickness of about 0.5 to 5 mm (more preferably, about 1 mm). Examples of materials of which the substrate 8 is appropriately made are polycarbonate and polymethyl methacrylate (PMMA).

The charge storage region 9 is a trap layer made of As2Se3, and the electric charges generated in the recording-side photoconductive layer 5 are stored in the charge storage region 9. Preferably, the thickness of the charge storage region 9 is about 0.1 micrometers. Alternatively, it is possible to provide a charge transport layer instead of providing the charge storage region. The charge transport layer behaves as almost an insulator against electric charges which are generated in the recording-side photoconductive layer 5 and move to the charge transport layer, and as almost a conductor of transport charges having the opposite polarity to the electric charges generated in the recording-side photoconductive layer 5 and move to the charge transport layer.

In the radiographic-image recording medium 10 according to the present embodiment, the fluorescent layer 20 is constituted by the support 1 which is transparent to the radiation for use in recording, and resistant to shock, and the wavelength conversion layer 2 which contains an organic binder and a fluorescent material which converts the radiation into the visible light. Therefore, the radiographic-image recording medium according to the first embodiment resists breaking even when the radiographic-image recording medium is mechanically shocked, e.g., when the radiographic-image recording medium is dropped, and the portability of the radiographic-image recording medium is enhanced.

Since the thermal expansion coefficients of the substrate 8 and the support 1 are almost identical, it is possible to prevent cracking and warpage which can occur depending on the difference in the thermal expansion coefficient, as well as to enhance the resistance to shock which is caused by being dropped or the like. For example, it is preferable that the thermal expansion coefficient of one of the substrate 8 and the support 1 is within 30% tolerance of the thermal expansion coefficient of the other of the substrate 8 and the support 1.

Although the protection layer 3 and the first electrode layer 4 are optically contacted with each other through an adhesive layer 30 in the above construction, alternatively, it is possible to bond the protection layer 3 and the first electrode layer 4 together through a sheet of a viscoelastic material which is transparent to visible light emitted from the fluorescent material, instead of using the adhesive layer. The sheet of the viscoelastic material is, for example, a gel sheet such as a silicone sheet. In the case where a sheet of a viscoelastic material is used, flexibility at the interface between the protection layer 3 and the first electrode layer 4 increases. In addition, since the protection layer 3 and the first electrode layer 4 can be bonded together at normal temperature, hardening of an adhesive is unnecessary. Therefore, it is possible to prevent warpage and the like caused by the adhesive hardening.

Although the fluorescent material in the fluorescent layer 20 is $CaWO_4$ or the like which converts the radiation into visible light in the blue wavelength range in the above construction, alternatively, it is possible to use a fluorescent material which converts the radiation into visible light in the green wavelength range, for example, $Gd_2O_2S:Tb^{3+}$. In this case, a-Se is a material of which the recording-side photoconductive layer 5 can be appropriately made. Since a-Si is highly resistant to heat, problems such as crystallization do not occur even when the temperature is raised to about 200° C. Therefore, it is possible to raise the temperature in order to accelerate hardening of the adhesive. In addition, it is also possible to use an organic semiconductor such as phthalocyanine or metallic phthalocyanine. Since a film of the organic semiconductor such as phthalocyanine or metallic phthalocyanine can be formed by coating, it is possible to form the recording-side photoconductive layer 5 at low cost.

Second Embodiment

Figure 2A:
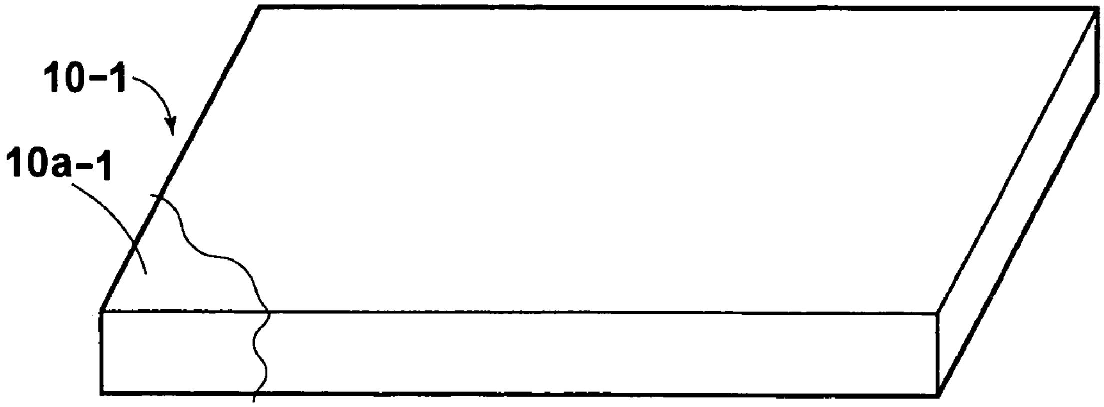
FIG. 2A is a perspective view of a radiographic-image recording medium according to a second embodiment of the present invention, in which a plurality of microplates are provided.
Figure 2B:
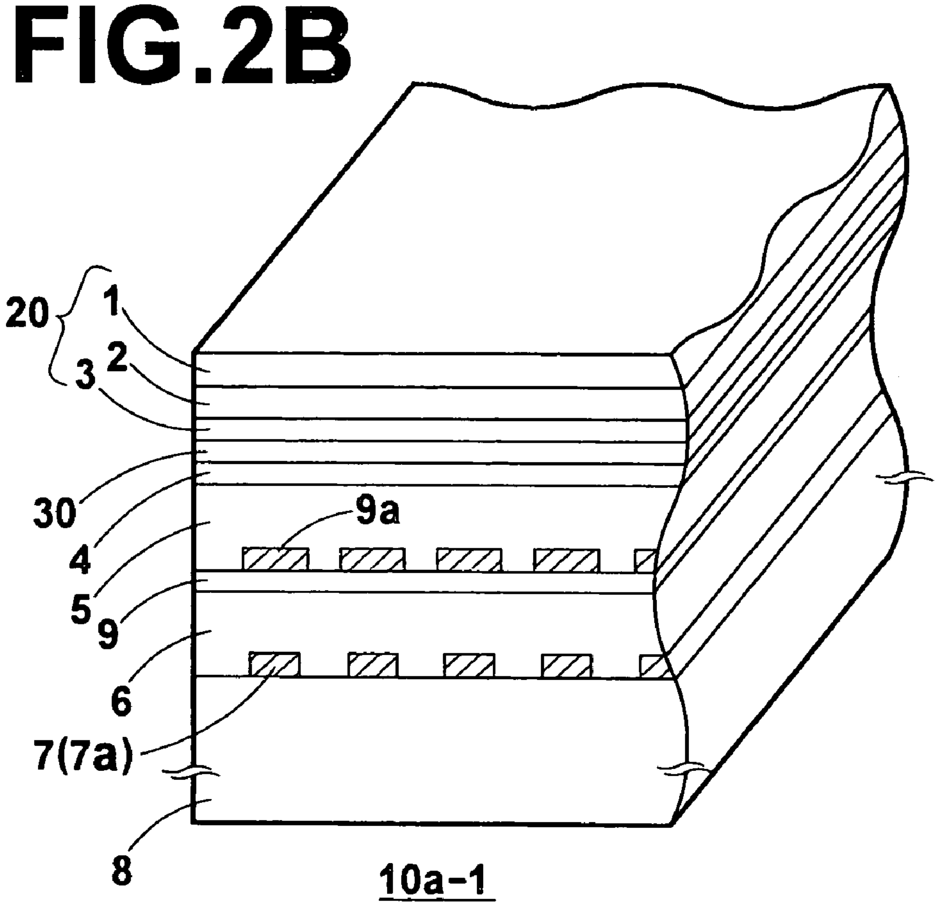
FIG. 2B is a magnified perspective view of a cutaway portion of the radiographic-image recording medium of FIG. 3A, where a cross section of the cutaway portion is illustrated.

FIG. 2A is a perspective view of a radiographic-image recording medium according to the second embodiment of the present invention, and FIG. 2B is a magnified perspective view of a cutaway portion 10*a*-1 of the radiographic-image recording medium 10-1 of FIG. 2A, where a cross section of the cutaway portion 10*a*-1 is illustrated in FIG. 2B.

The radiographic-image recording medium 10-1 according to the second embodiment is different from the radiographic-image recording medium 10 according to the first embodiment in that a plurality of microplates 9*a* are provided at the interface between the recording-side photoconductive layer 5 and the charge storage region 9 so that the plurality of microplates 9*a* are respectively located opposite to the plurality of elements 7*a*. For example, the material for the plurality of microplates 9*a* is formed on the charge storage region 9 by a vacuum evaporation or chemical deposit method. The plurality of microplates 9*a* can be realized by extremely thin films of a non-alloy metal such as gold, silver, aluminum, copper, chromium, titanium, platinum, or the like, or an alloy such as indium oxide. Since the microplates 9*a* are arranged as above, it becomes possible to constantly maintain at the same potential electric charges stored in the entire area of the plurality of microplates 9*a*. Therefore, electric charges which are located apart from the plurality of elements 7*a* can be satisfactorily discharged, i.e., it is possible to reduce the amount of electric charges left after reading.

Third Embodiment

Figure 3A:
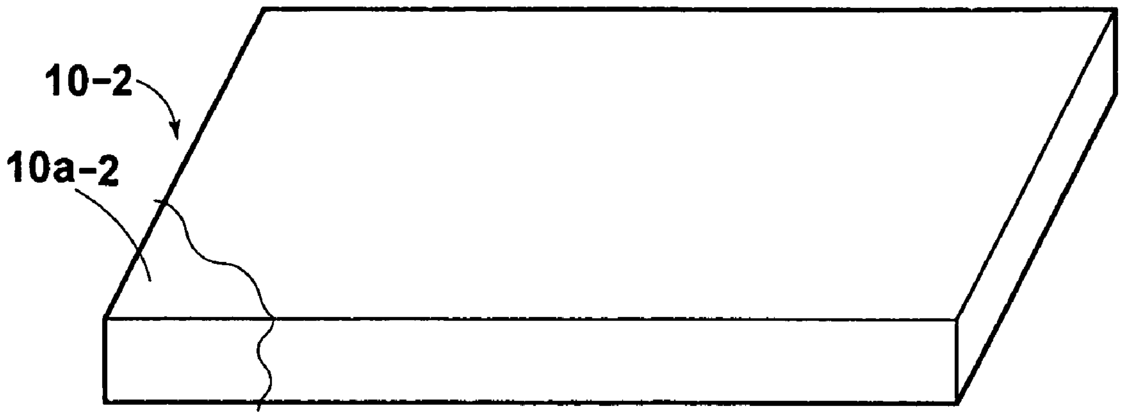
FIG. 3A is a perspective view of a radiographic-image recording medium according to a third embodiment of the present invention, in which first and second striped electrode arrays are provided.
Figure 3B:
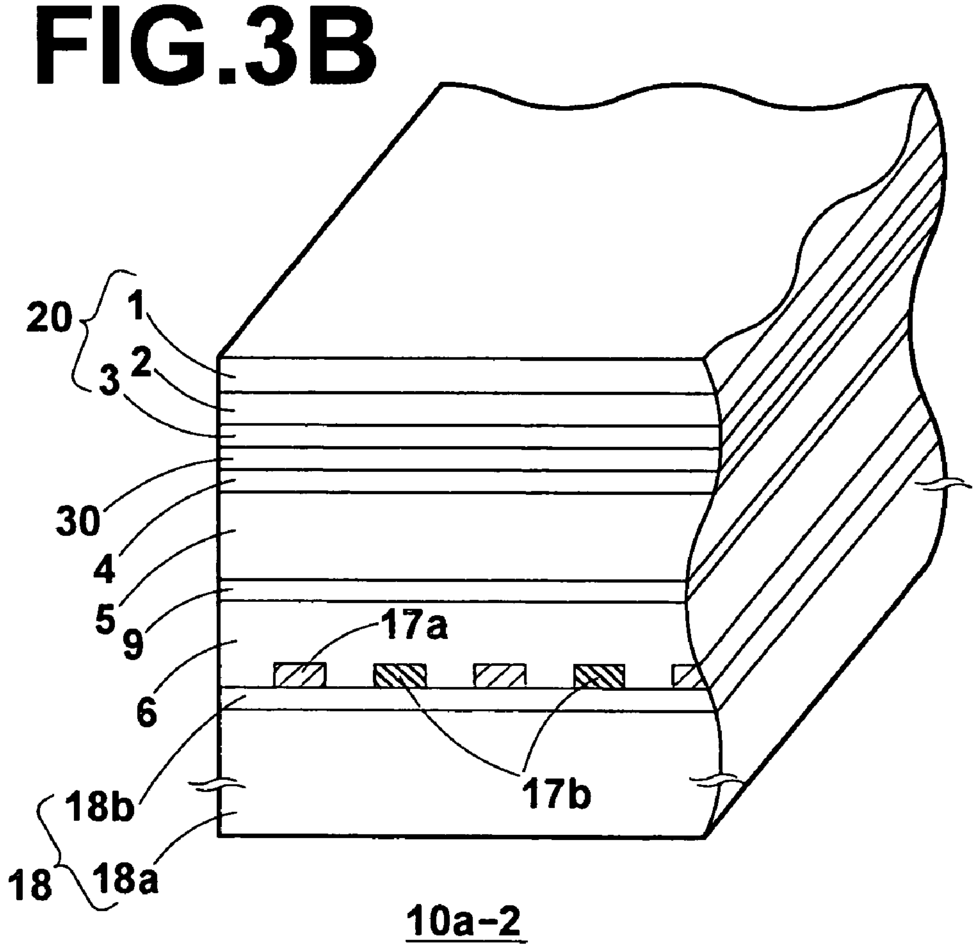
FIG. 3B is a magnified perspective view of a cutaway portion of the radiographic-image recording medium of FIG. 3A, where a cross section of the cutaway portion is illustrated.

FIG. 3A is a perspective view of a radiographic-image recording medium according to the third embodiment of the present invention, and FIG. 3B is a magnified perspective view of a cutaway portion 10*a*-2 of the radiographic-image recording medium 10-2 of FIG. 3A, where a cross section of the cutaway portion 10*a*-2 is illustrated in FIG. 3B.

The radiographic-image recording medium 10-2 according to the third embodiment is different from the radiographic-image recording medium 10 according to the first embodiment in that the second electrode layer includes the first and second striped electrode arrays, where the first striped electrode array is comprised of a plurality of first elements (first linear electrodes) 17*a* which are formed with a pitch corresponding to a pixel pitch, and the second striped electrode array is comprised of a plurality of second elements (second linear electrodes) 17*b* which are arranged alternately with and almost parallel to the plurality of first elements 17*a*. The plurality of first elements 17*a* are transparent to the reading light, and the plurality of second elements 17*b* do not allow transmission of the reading light through the plurality of second elements 17*b*.

In the above construction, electric charges having the opposite polarity to that of the electric charges stored in the charge storage region 9 can be stored in the plurality of second elements 17*b* as well as the plurality of first elements 17*a*. Therefore, it is possible to increase the amount of signal charges which can be read out of the radiographic-image recording medium 10-2, and enhance the efficiency in reading the signal charges.

When the plurality of first elements 17*a* and the plurality of second elements 17*b* are formed, etching or the like is used. In this case, the substrate 18 can be produced by forming a thin glass film 18*b* having a thickness of about 0.05 to 0.2 mm on a surface of a plate 18*a* being made of polycarbonate and having a thickness of about 0.1 to 3 mm As illustrated in FIG. 3B. Then, a material of which each of the first and second striped electrode arrays is made is deposited on the thin glass film 18*b* by evaporation, and thereafter the striped electrode array is shaped by etching or the like.

Further, it is possible to remove the plate 18*a* after the layers up to the fluorescent layer 20 are formed.

Fourth Embodiment

Figure 4A:
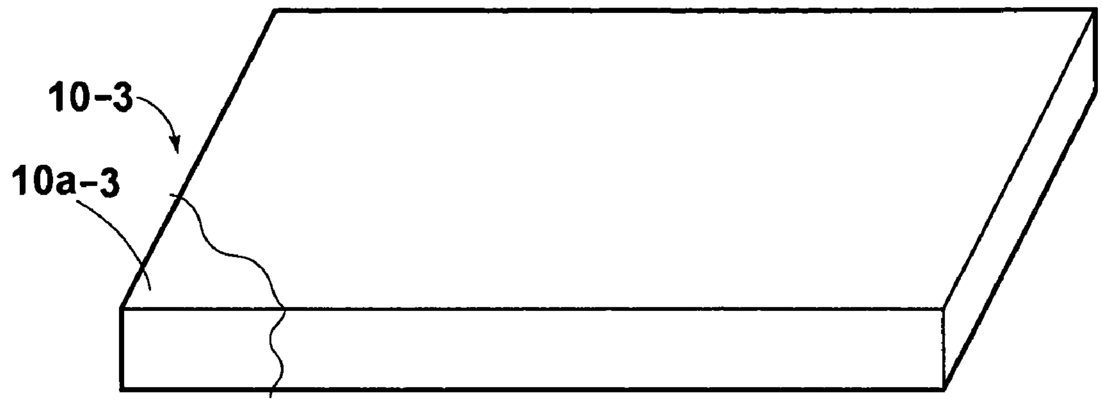
FIG. 4A is a perspective view of a radiographic-image recording medium according to a third embodiment of the present invention, in which no substrate remains.
Figure 4B:
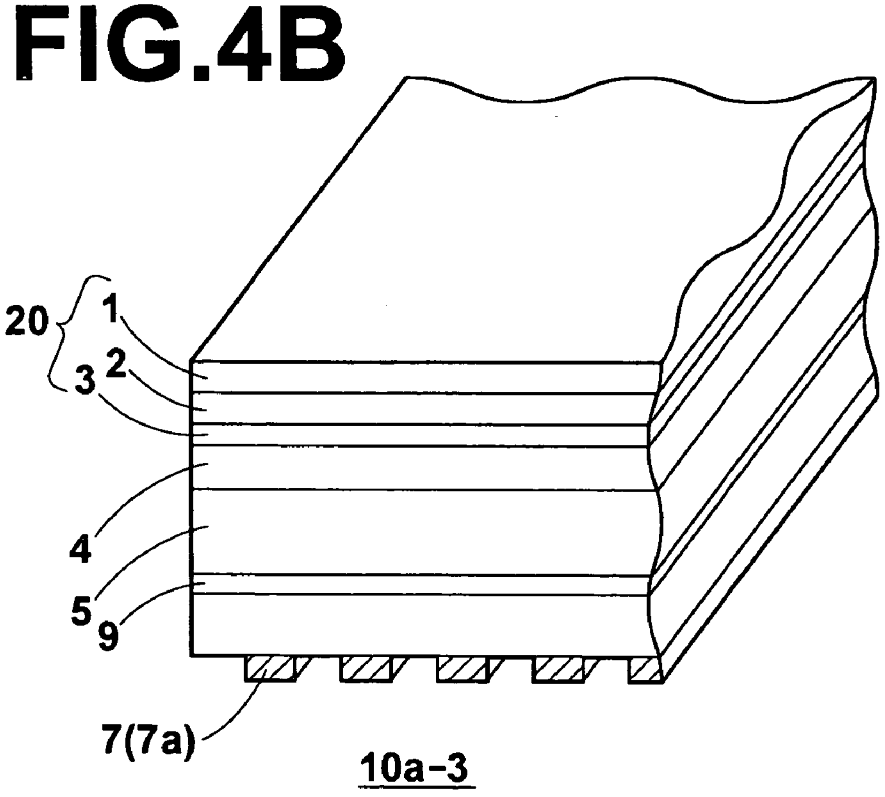
FIG. 4B is a magnified perspective view of a cutaway portion of the radiographic-image recording medium of FIG. 3A, where a cross section of the cutaway portion is illustrated.

FIG. 4A is a perspective view of a radiographic-image recording medium according to the fourth embodiment of the present invention, and FIG. 4B is a magnified perspective view of a cutaway portion 10*a*-3 of the radiographic-image recording medium 10-3 of FIG. 4A, where a cross section of the cutaway portion 10*a*-3 is illustrated in FIG. 4B.

The radiographic-image recording medium 10-3 according to the fourth embodiment is different from the radiographic-image recording medium 10 according to the first embodiment in that no substrate is left in the radiographic-image recording medium 10-3.

In this case, the fluorescent layer 20 may be produced by using as the fluorescent material, for example, $Gd_2O_2S$:$Tb^{3+}$, which converts the radiation into visible light in the green wavelength range. Then, the first electrode layer 4 is directly formed on the exposed surface of the protection layer 3 in the fluorescent layer 20, where the first electrode layer 4 is made of ITO or IDXO. Next, the recording-side photoconductive layer 5 of amorphous silicon (a-Si) is formed on the first electrode layer 4, where a-Si exhibits conductivity when exposed to visible light in the green wavelength range which is emitted from the fluorescent layer 20. Thereafter, the charge storage region 9, which is made of a-SiC:H, a-SiN:H, or a-SiO:H, is formed, and then the reading-side photoconductive layer 6, which is made of, for example, a-Si as a photoconductive material which can be formed by patterning using photolithography, is formed on the charge storage region 9. Finally, a transparent electrode film made of ITO or IDXO is formed on the reading-side photoconductive layer 6, and the second electrode layer 7 is formed by photolithography. Thus, the recording-side photoconductive layer 5, the charge storage region 9, and the reading-side photoconductive layer 6 can be formed by similar a-Si film formation processes. Therefore, it is possible to improve reliability and reduce the cost.

Fifth Embodiment

Figure 5:
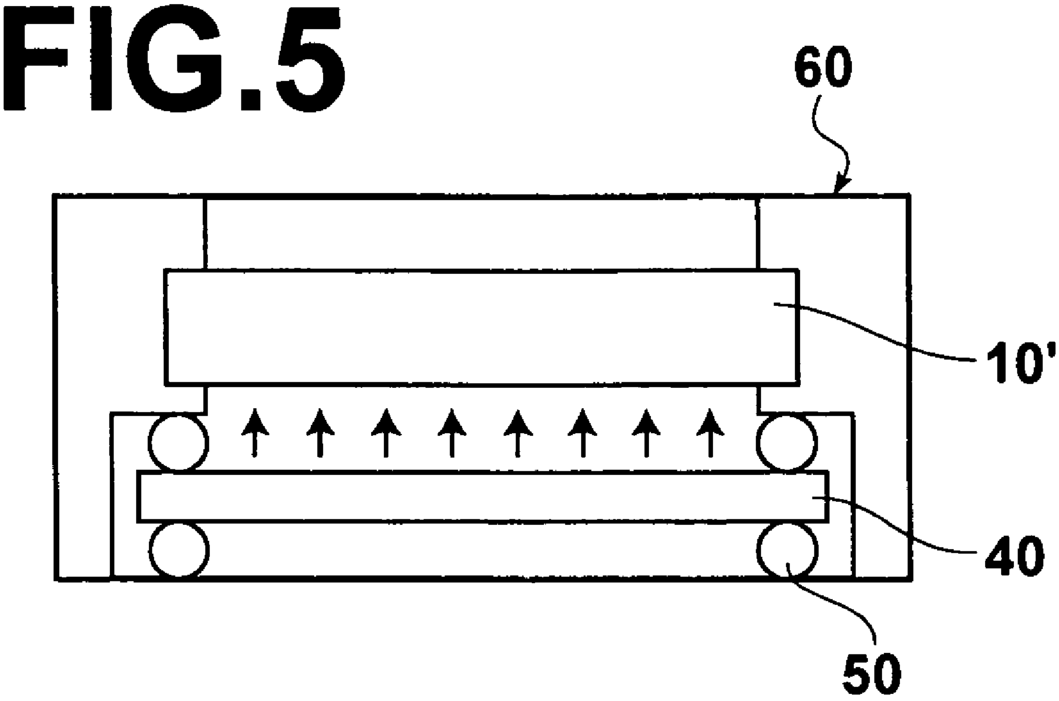
FIG. 5 is a cross-sectional view of a recording-medium unit according to a fifth embodiment of the present invention, in which a radiographic-image recording medium and a mechanism for reading are contained in a casing.

FIG. 5 is a cross-sectional view of a recording-medium unit according to the fifth embodiment of the present invention. As illustrated in FIG. 5, the recording-medium unit according to the fifth embodiment of the present invention comprises a radiographic-image recording medium 10', a linear light source 40, a scanning mechanism 50, and a casing 60.

The radiographic-image recording medium 10' is any of the aforementioned radiographic-image recording mediums according to the first to fourth embodiments. The linear light source 40 illuminates the radiographic-image recording medium 10' with reading light. The scanning mechanism 50 moves the linear light source 40 along the Y-axis direction in order to scan the radiographic-image recording medium 10' with the reading light emitted from the linear light source 40. The casing 60 is a portable casing which encloses the radiographic-image recording medium 10', the linear light source 40, and the scanning mechanism 50. The casing 60 is transparent to the radiation for use in recording, and shields the radiographic-image recording medium 10' from visible light.

Sixth Embodiment

Figure 6:
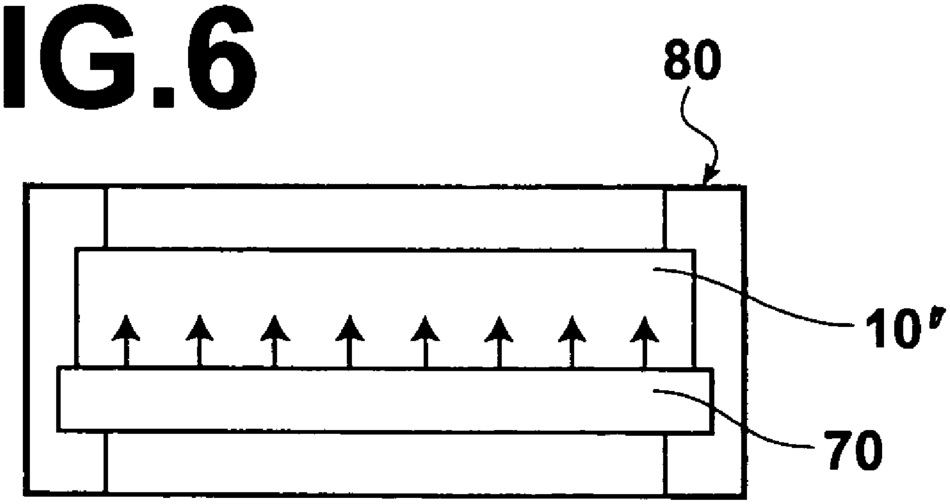
FIG. 6 is a cross-sectional view of a recording-medium unit according to a sixth embodiment of the present invention, in which a radiographic-image recording medium and a mechanism for reading are contained in a casing, and a planar light source is used.

FIG. 6 is a cross-sectional view of a recording-medium unit according to the sixth embodiment of the present invention. As illustrated in FIG. 6, the recording-medium unit according to the sixth embodiment of the present invention comprises a radiographic-image recording medium 10', a planar light source 70, and a casing 80.

The recording-medium unit according to the sixth embodiment is different from the recording-medium unit according to the fifth embodiment in that a planar light source 70 is provided instead of the linear light source 40 and the scanning mechanism 50. The planar light source 70 is realized by, for example, a linearly patterned, organic electroluminescent panel. The casing 80 is a portable casing which encloses the radiographic-image recording medium 10' and the planar light source 70. The casing 80 is transparent to the radiation for use in recording, and shields the radiographic-image recording medium 10' from visible light.

According to the fifth and sixth embodiments, it is possible to realize portable recording-medium units containing a radiographic-image recording medium and a mechanism for reading.

Seventh Embodiment

The radiographic-image recording medium according to the seventh embodiment of the present invention is different from the radiographic-image recording medium according to the third embodiment illustrated in FIG. 3B in that a plurality of photoelectric elements are formed on the thin glass film 18*b* instead of providing the first electrode layer 4, the recording-side photoconductive layer 5, the charge storage region 9, and the reading-side photoconductive layer 6 in the construction illustrated in FIG. 3B, where each of the plurality of photoelectric elements is constituted by a photodiode and a TFT switch. In this case, the plate 18*a*, the thin glass film 18*b*, and the plurality of photoelectric elements constitute a photoelectric conversion layer. In addition, the fluorescent layer 20 as illustrated in FIG. 3B is formed on the photoelectric conversion layer. Thus, the visible light emitted from the fluorescent layer 20 can be detected by the plurality of photoelectric elements.

According to the above construction, it is unnecessary to use the thick glass substrate which is used in the radiographic-image recording medium as disclosed in the aforementioned document (2). Therefore, the radiographic-image recording medium according to the seventh embodiment resists breaking even when the radiographic-image recording medium is mechanically shocked, e.g., even when the radiographic-image recording medium is dropped, and the portability of the radiographic-image recording medium is enhanced.

In addition, since the thermal expansion coefficient of the plate 18*a* is approximately the same as the thermal expansion coefficient of the support 1 in the fluorescent layer 20, it is possible to prevent cracking and warpage which can occur depending on the difference in the thermal expansion coefficient, as well as to enhance the resistance to shock which is caused by being dropped or the like.

It is possible to bond the fluorescent layer 20 and the photoelectric conversion layer together through a sheet of a viscoelastic material which is transparent to the visible light emitted from the fluorescent material as mentioned before.

Further, it is possible to remove the plate 18*a* after the layers up to the fluorescent layer 20 are formed in the radiographic-image recording medium according to the seventh embodiment. That is, the substrate may be constituted by only the thin glass film 18*b*.

All of the contents of the Japanese patent application No. 2002-336519 are incorporated into this specification by reference.

What is claimed is:

1. A radiographic-image recording medium comprising:

a support which is transparent to radiation for use in recording, and resistant to shock;

a wavelength conversion layer which is formed under said support, and contains an organic binder and a fluorescent material which converts said radiation into an electromagnetic wave for use in recording, where the electromagnetic wave belongs to a first wavelength band different from a second wavelength band to which the radiation belongs; and a photoelectric conversion layer which is formed under said wavelength conversion layer, and contains a substrate and at least one photoelectric element which photoelectrically converts said electromagnetic wave into at least one electric signal, where the substrate includes a plate of a shock-resistant material and a thin glass film formed on the plate, and the at least one photoelectric element is arranged on the thin glass film.

2. A radiographic-image recording medium according to claim 1, wherein said plate and said support are made of materials having approximately identical thermal expansion coefficients.

3. A radiographic-image recording medium according to claim 1, wherein said wavelength conversion layer and said photoelectric conversion layer are bonded together through a viscoelastic material which is transparent to said electromagnetic wave.

4. A radiographic-image recording medium comprising:

a support which is transparent to radiation for use in recording, and resistant to shock;

a wavelength conversion layer which is formed under said support, and contains an organic binder and a fluorescent material which converts said radiation into an electromagnetic wave for use in recording, where the electromagnetic wave belongs to a first wavelength band different from a second wavelength band to which the radiation belongs; and a photoelectric conversion layer which is formed under said wavelength conversion layer, and contains a substrate and at least one photoelectric element which photoelectrically converts said electromagnetic wave into at least one electric signal, where the substrate is realized by a thin glass film, and the at least one photoelectric element is arranged on the substrate.

5. A radiographic-image recording medium according to claim 4, wherein said wavelength conversion layer and said photoelectric conversion layer are bonded together through a viscoelastic material which is transparent to said electromagnetic wave.

* * * * *